(12) United States Patent
Vavro

(10) Patent No.: US 7,178,009 B2
(45) Date of Patent: Feb. 13, 2007

(54) DIFFERENT REGISTER DATA INDICATORS FOR EACH OF A PLURALITY OF CENTRAL PROCESSING UNITS

(75) Inventor: David K. Vavro, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 835 days.

(21) Appl. No.: 09/826,134

(22) Filed: Apr. 4, 2001

(65) Prior Publication Data

US 2002/0147768 A1   Oct. 10, 2002

(51) Int. Cl.
*G06F 9/30* (2006.01)
(52) U.S. Cl. ............... 712/217; 712/218; 712/225
(58) Field of Classification Search ........... 712/216, 712/217, 218, 225; 711/100, 147, 148–153
See application file for complete search history.

(56) References Cited

U.S. PATENT DOCUMENTS 5,050,070 A * 9/1991 Chastain et al. ........... 712/203
5,293,500 A * 3/1994 Ishida et al. .............. 712/217

OTHER PUBLICATIONS

Hennessy, et al., Computer Architecture a Quantitative Approach, Morgan Kaufman Publishers Inc., Second Edition, pp. 246-251.*

* cited by examiner

*Primary Examiner*—Fritz Fleming
*Assistant Examiner*—Tonia L. Meonske
(74) *Attorney, Agent, or Firm*—Trop, Pruner & Hu, P.C.

(57) ABSTRACT

A digital signal processor may include a plurality of processing elements that are coupled together to accomplish a specialized function. Each processing element may utilize the same shared storage in a form of a plurality of general purpose registers. Each of these registers may be accessed by any of the processing elements. Each register may include a data storage section and a plurality of storage areas for data valid bits that indicate whether the data is valid or not for each of the plurality of processing elements.

17 Claims, 3 Drawing Sheets

DIFFERENT REGISTER DATA INDICATORS FOR EACH OF A PLURALITY OF CENTRAL PROCESSING UNITS

BACKGROUND

This invention relates generally to digital signal processing and in particular aspects to architectures for digital signal processors.

Digital signal processors generally modify or analyze information measured as discrete sequences of numbers. Digital signal processors are used for a wide variety of signal processing applications such as television, multimedia, audio, digital image processing and telephony as examples. Most of these applications involve a certain amount of mathematical manipulation, usually multiplying and adding signals.

A large number of digital signal processors are available from a large number of vendors. Generally, each of these processors is fixed in the sense that it comes with certain capabilities. Users attempt to acquire those processors which best fit their needs and budget. However, the user's ability to modify the overall architecture of the digital signal processor is relatively limited. Thus, these products are packaged as units having fixed and immutable sets of capabilities.

In a number of cases, it would be desirable to have the ability to create a digital signal processor that performs complex functions that are specifically adapted to particular problems to be solved. Thus, it would be desirable that the hardware and software of the digital signal processor be adapted to a particular function. However, such a digital signal processor might enjoy a relatively limited market. Given the investment in silicon processing, it may not be feasible to provide a digital signal processor, which has been designed to meet relatively specific needs. However, such a device would be highly desirable. It would provide the greatest performance for the expense incurred, since only those features that are needed are provided. Moreover, those features may be provided that result in the highest performance without unduly increasing cost.

Multiprocessing digital signal processors or media processors generally use a hierarchical or a peer-to-peer processor array. The timing between instructions and data is invariable, known and fixed in hardware. The assembler or programmer uses the delay information to ensure that timing dependencies are met. When new processing elements are added to the overall architecture, they tend to require that preexisting code be rewritten. Moreover, the software that runs the digital signal processor is dependent on hardware timing and thus is not portable across different silicon process technologies. Binary or assembly code written on one version of these processors may not be portable to other versions that have different processing elements.

These architectures may also use a master control processor that does not contribute to the data processing work because it is busy directing the slave processors. The assembler or programmer is involved in predicting the clock-to-clock timing dependencies on variables stored in memories.

Thus, there is a need for digital signal processors that are adaptable to the addition of new processing elements, independent of hardware timing, more communication efficient or less timing dependent.

DETAILED DESCRIPTION

Figure 1:
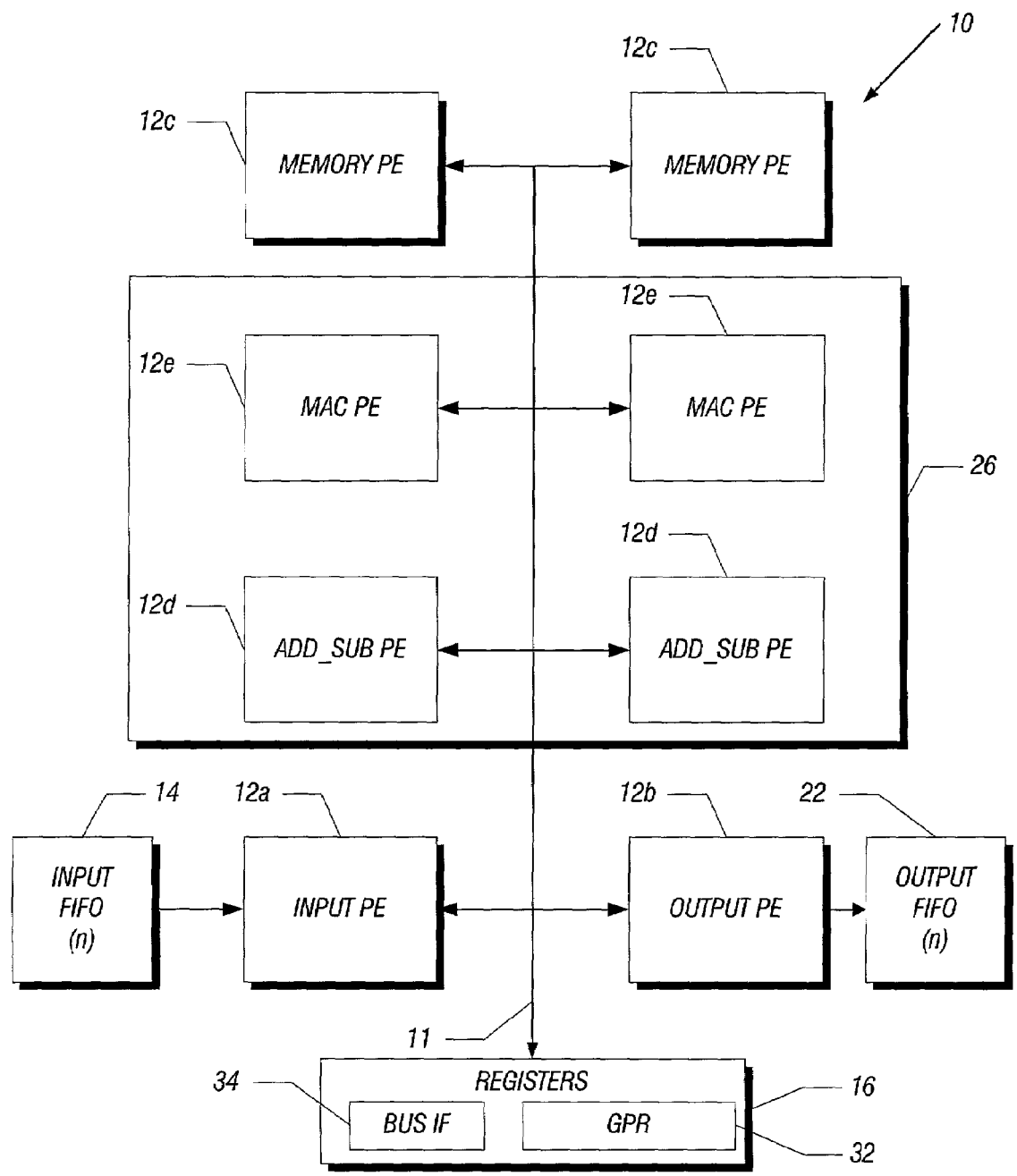
FIG. 1 is a block diagram of one embodiment of the present invention.

A digital signal processor 10 may include a plurality of processing elements 12a, 12b, 12c, 12d and 12e each having their own instruction sets. The individual processing elements 12 need not communicate directly with one another but instead may communicate through storage registers associated with a general purpose register (GPR) 32 that is part of the register 16. Thus, the results of an operation performed by one of the processing elements 12 may be stored in the GPR 32 for access by another processing element 12.

Each of the processing elements 12 may be separately programmed with its own set of codes. The instruction sets for each processing element 12 may provide the logic for operating the particular functions for that processing element 12, avoiding the need for separate hardware logic for implementing the subprocessor functions, in one embodiment of the invention.

A programmable input processor (PIP) 12a receives inputs from a receive buffer such as a first in first out (FIFO) register 14. The PIP 12a may, in some embodiments of the present invention, provide a precision change or a scaling of an input signal. The PIP 12a may be advantageous since it may provide for input data processing when input signals are available and may provide mathematical operations at other times.

The programmable output processor (POP) 12b provides outputs to a transmit buffer 22 such as a first in first out (FIFO) register. The POP 12b may also do mathematical operations when no output data is available for transmission to the transmit buffer 22.

The programmable random access memory (RAM) processor (PRP) 12c basically stores and retrieves data. It may be particularly advantageous in storing intermediate results, in a cache-like fashion. This may be particularly applicable in two-dimensional image processing.

Some embodiments of the present invention may use normal length words but other embodiments may use the so-called very long instruction word (VLIW). VLIW may be advantageous in some embodiments because the logic may be in effect contained within the instructions and glue logic to coordinate the various subprocessors may be unnecessary.

A number of mathematical processors 12 may be provided within the unit 26 based on the particular needs in particular applications. In the illustrated embodiment, a pair of identical add and subtract programmable mathematical processors (PMP) 12d are combined with a pair of multiply and accumulate (MAC) programmable mathematical processors (PMP) 12e. However, a variety of other mathematical processors may be plugged into the digital signal processor 10 in addition to or in place of any of those illustrated.

Each of the processing elements 12 may be programmable, contain its own random access memory and decode the random access memory contents into instructions, in one embodiment of the invention.

The register 16 contains general purpose registers for storing data and allowing the accessing of data by the programmable processing elements 12. The inclusion of a programmable random access memory processor 12c, programmable input processor 12a and the programmable output processor 12b allows very flexible input, output and data manipulation/storage operations to take place in parallel with mathematical operations.

The register 16 includes a bus interface 34 and N general purpose registers 32 configured to allow independent read and write operations that can occur from a number of processing elements 12 at the same time. The GPR 32 allows independent data transfers from any of the other processing elements 12 and to any of the other processing elements 12. The GPR 32 includes registers for each of the processing elements 12 that can be written to by any processing element 12. If two processing elements 12 try to write to the same register, an error flag is set.

Figure 2:
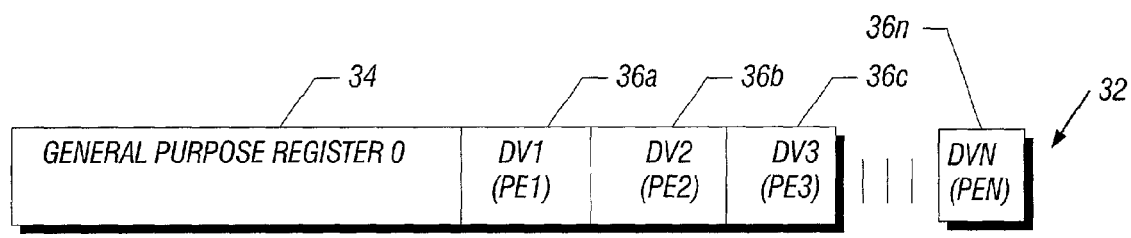
FIG. 2 is a depiction of a register configuration in accordance with one embodiment of the present invention.

Each of the general purpose registers 32 may include the configuration shown in FIG. 2 in one embodiment. As one example, the general purpose register zero may include a data section 34 including a predetermined amount of data such as one word, in one embodiment. Appended to that data section 34 are a plurality of bits, one bit for each of the processing elements 12 included in the digital signal processor 10. Thus, there may be a data valid bit 1 (DV-1) for the input processing element 12a, as indicated at 36a, a data valid bit (DV-2) for the processing element 12b as indicated at 36b and a data valid bit (DV-3) for the processing element 12c as indicated at 36c and so on.

The data section 34 may be written to or read out from the register 32 without necessarily changing the data valid bits 36. The bits 36 are not read out during a read or overwritten during a write of the data section 34. Thus, the bits 36 indicate a state relative to each of the processing elements 12 making up the digital signal processor 10 and a particular data section 34.

The architecture shown in FIG. 1 is simply an example of on potential architecture. The number of input processors 12a and output processors 12b may vary from on e to several. The number of memory processors 12c is also considerably variable. Likewise, the number and arrangement of the MAC processors 12e, or add and subtract processors 12d may likewise be subject to considerable variability. Other processing elements 12 (not illustrated) may be combined as well.

All data inputs and outputs to the processing elements 12 take place through the general register 32. The processing elements 12 have direct read and write access through registers 32 through a full cross bar connection bus 11. The processing elements 12 use the semaphore illustrated in FIG. 2 for reading or writing data to or from the registers 32.

Instructions are executed by any given processing elements 12 when all the necessary data is currently available in a general purpose register 32 as indicated by the data valid bits 36. Storage of the result of instruction execution by a given processing element 12 occurs when space is available in a general purpose register 32 (unless the results of the instruction do not target a register 32). Thus, the multi-processing environment is data driven, shared register with a peer-to-peer architecture using a multiple instruction, multiple data type digital signal processor 10.

Each of the processing elements 12, executing instructions that require data from a register 32, wait until the corresponding data valid bits 36 are set active. That is, a given processor 12 does not read a data section 34 from a given register until the corresponding data valid bit for that processing element 12 is set active. Once all of the data valid bits 36 are set, an instruction may execute and may (or may not) reset the data valid bits as the data section 34 is read from the register 32.

A processing element 12 waits until all data valid bits (except for the data valid bit for that processing element) are inactive before writing into the data section 34. When all data valid bits are clear (except for the processing element's own bit), the result of a processing element's operation may be written to a register 32. If any data valid bits are active (except for the processing element's data valid bit), then the processing element's pipeline stalls. When data is written into a register 32, the intended destination processing element 12 for the data is indicated by setting the corresponding data valid bit for the destination processing element 12.

All data valid bits can be set by any processing element 12 to indicate a constant variable is stored in the data section 34 that may be used by all processing elements. In this case, a processing element 12 does not reset its data valid bit when reading the data section 34 from a register 32 until access to the constant by all processing elements 12 is complete. Each processing element 12 is responsible for resetting its data valid bit on its last access of the constant to free up the general purpose register 32 for additional use by other waiting processing elements needing available register space.

Figure 3:
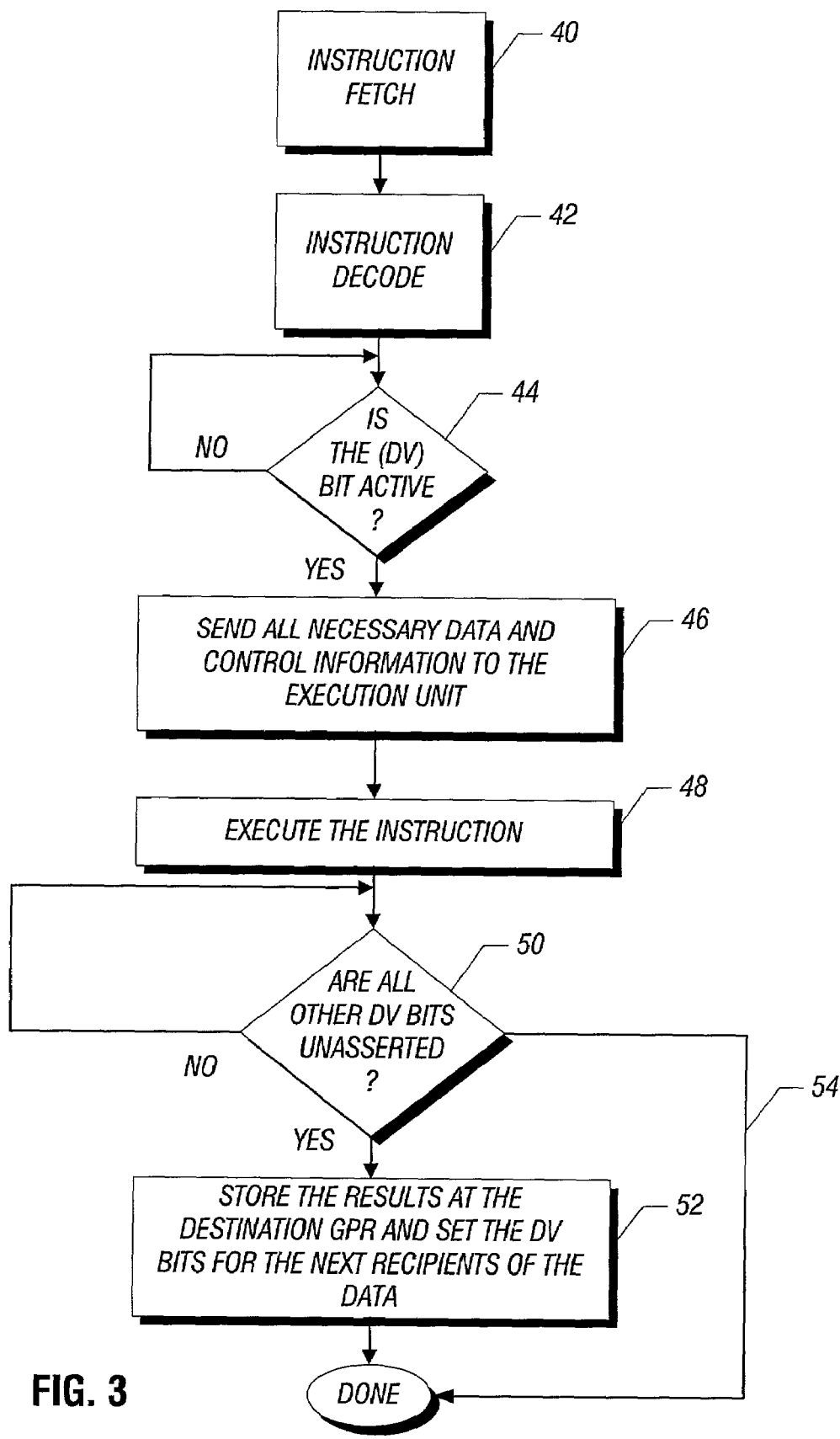
FIG. 3 is a flow chart for one embodiment of the present invention.

Referring to FIG. 3, initially, an instruction written by a programmer is fetched as indicated at block 40. The instruction is decoded as indicated in block 42. If the instruction requires data, a check at diamond 44 determines whether the data valid bit for a given processing element 12 executing the instruction is active for each data section 34 that is needed to execute the instruction. If not, the flow awaits the situation when all the data valid bits for all the needed data sections 34 are valid.

When that situation occurs, the instruction may be prepared for execution by routing or sending all the necessary data and controller information to the execution unit of the appropriate processing element 12. If appropriate, the processing element 12 may then reset its data valid bit for that data section 34 if the data section 34 is not needed anymore by that particular processing element, as indicated in block 46.

After the instruction is executed, as indicated in block 48, if there is an instruction execution result to store, the destination register 32 is checked to determine if it is available. Its availability may be determined, at diamond 50, by checking that all other data valid bits are unasserted except for the data valid bit for the processor which wishes to store data in the data section 34 of the register 32.

If this is not the case, because another data valid bit is asserted, the flow simply awaits the deassertion of the data valid bit. If there are no results to store as indicated at line 54, the flow terminates. If there is a result to store and other data valid bits are unasserted, the results are stored in the destination general purpose register 32 as indicated in block 52. The data valid bits are then set for the next recipients of the data. The bit is set pursuant to the instructions that were executed.

As a simple example, suppose a first processing element 12 is to execute the operation C=A×B and a second processing element 12 is going to execute E=C×D. The second processing element 12 cannot execute the instruction until the first processing element 12 stores C in the general purpose register 32. The instruction for E=C×D has two data dependency bits that indicate which asserted data valid bits 36 to look for. In this case, C in GPR X and D in GPR Y must be checked. Only when both data valid bits are asserted is the data available allowing instruction execution. When data sections for C and D are read from the general purpose register 32, the associated data valid bits 36 for the second processing element 12 may be cleared, indicating that the data is no longer needed by the second processing element 12.

Before the first processing element 12 can store C into the specified general purpose register 32, all data valid bits 36 must be deasserted. When all data valid bits 36 are deasserted, the general purpose register 32 no longer has valid data intended for other processing elements 12. As a result, one may write to the general purpose register 32. When the first processing element 12 stores C in a GPR X, the first processing element also asserts that the data valid bit that the data in this case C, is intended for the second processing element, so the data valid bit (DV-2) associated with the second processing element is asserted. This process and protocol may be maintained throughout interactions with the general purpose register 32, providing self-timed, data dependent instruction execution.

The advantages over a non-data driven architecture may include, in some embodiments, providing an architecture that can adapt to the addition of new processing elements without affecting preexisting code. Expanding the number of data valid bits may have no affect, in some embodiments, because the data valid bits that do not get set do not get used. This assumes that the encoding of the instruction is such that the old instruction fits inside the new instruction space and the new data valid control bits are not utilized. A purely data driven instruction execution model, in one embodiment, allows software to be functional, hardware timing independent and thus portable across different silicon processing technologies. Binary assembly code written on one version of the digital signal processor 10 may be portable across other processors that have different types or versions of the same processing elements.

A peer-to-peer multi-processor interconnect and communication method may be more efficient than a hierarchical multiprocessing method. The use of a master control processor in a hierarchical style system does not contribute to the data processing work because the master control processor is too busy directing the slave processors.

The assembler or programmer may be detached from having to predict the clock-to-clock timing dependencies on variables stored in registers. Post analysis can be performed when the data dependent delays are back annotated and then instructions can be rearranged by the assembler to increase performance.

Different pipelining depths that are mode dependent can be changed on the fly, can be of any depth and can still provide software compatibility and correct functionality.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   providing a register accessible by a plurality of central processing units; and
   indicating whether data in said register is available for a given central processing unit by providing different indicators assigned to each of a plurality of central processing units and causing the given central processing unit to reset its indicator when the data in said register is no longer useful to the given central processing unit.

2. The method of claim 1 including indicating for each of a plurality of central processing units whether the data is available for a given central processing unit.

3. The method of claim 2 including requiring a central processing unit to wait to execute an instruction until the data it needs to execute the instruction is available in one or more registers.

4. The method of claim 3 including providing a bit for each item of data indicating whether a given central processing unit can access that data.

5. The method of claim 4 including resetting said bit when said data is accessed by a given central processing unit.

6. The method of claim 1 including preventing any central processing unit from writing data to said register until all of the indicators for the plurality of central processing units indicate that the data is no longer useful to any other central processing unit.

7. The method of claim 6 including indicating the central processing unit which will utilize the data written into the register.

8. The method of claim 1 includes causing a plurality of central processing units to access a register at the same time.

9. The method of claim 1 including providing specialized central processing units for mathematical operations and for memory.

10. The method of claim 1 including providing an input central processing unit, an output central processing unit and coupling said input, output and specialized central processing units to said register through a cross-bar connection.

11. A computer readable medium storing instructions that, when executed, enable a processor-based system to:
    make a register accessible by a plurality of central processing units in said system;
    provide different indictors for each of a plurality of central processing units;
    indicate whether data in said register is available for a given processing unit; and
    cause the given central processing unit to reset its indicator when data in the register is no longer useful for the given central processing unit.

12. The medium of claim 11 further storing instructions that cause the processor-based system to determine whether data is available in a register for a particular processing unit.

13. The medium of claim 12 further storing instructions that cause the processor-based system to prevent execution of an instruction until the data needed to execute the instruction is available in one or more registers.

14. The medium of claim 13 further storing instructions that cause the processor-based system to check a bit in said register for each item of data indicating whether a processing unit can access said data.

15. The medium of claim 14 further storing instructions that cause the processor-based system to reset said bit when said data is accessed by a processing unit.

16. The medium of claim 15 further storing instructions that cause the processor-based system to avoid writing said data to said register until all the bits indicate that the data is no longer useful to any other processing unit.

17. The medium of claim 16 further storing instructions that cause the processor-based system to indicate which processing unit will utilize the data written into the register by another processing unit.

* * * * *